United States Patent [19]

Tuson et al.

[11] Patent Number: 5,242,296
[45] Date of Patent: Sep. 7, 1993

[54] HYBRID OXIDANT COMBUSTION METHOD

[75] Inventors: Geoffrey B. Tuson, Yorktown Heights; Hisashi Kobayashi, Putnam Valley, both of N.Y.

[73] Assignee: Praxair Technology, Inc., Danbury, Conn.

[21] Appl. No.: 986,833

[22] Filed: Dec. 8, 1992

[51] Int. Cl.$^5$ .............................................. F23M 3/04
[52] U.S. Cl. ...................................... 431/10; 431/190
[58] Field of Search .................................. 431/10, 190

[56] References Cited

U.S. PATENT DOCUMENTS

| | | | |
|---|---|---|---|
| 4,017,253 | 4/1977 | Wielang et al. | 431/10 |
| 4,541,796 | 9/1985 | Anderson | 431/10 |
| 4,599,100 | 7/1986 | Demarest, Jr. | 65/134 |
| 4,973,346 | 11/1990 | Kobayashi | 65/135 |
| 5,002,483 | 3/1991 | Becker | 431/352 |
| 5,076,779 | 12/1991 | Kobayashi | 431/5 |
| 5,085,156 | 2/1992 | Dykema | 110/347 |
| 5,104,310 | 4/1992 | Saltin | 431/10 |
| 5,147,438 | 9/1992 | Castelain et al. | 65/135 |

OTHER PUBLICATIONS

Trimming $NO_x$ From Furnaces, A. Garg, Chemical Engineering, Nov. 1992, pp. 122–129.

*Primary Examiner*—Carroll B. Dority
*Attorney, Agent, or Firm*—Stanley Ktorides

[57] ABSTRACT

A combustion method employing two different oxidants wherein the first oxidant incompletely combusts fuel and a second oxidant having a higher oxygen concentration completes the combustion in a defined manner which reduces $NO_x$ generation.

6 Claims, 3 Drawing Sheets

HYBRID OXIDANT COMBUSTION METHOD

TECHNICAL FIELD

This invention relates to combustion employing two different oxidants and is particularly useful for carrying out combustion with reduced $NO_x$ generation.

BACKGROUND ART

Nitrogen oxides ($NO_x$), are a significant pollutant generated during combustion and it is desirable to reduce their generation in carrying out combustion. Typically combustion is carried out by reacting fuel with air as the oxidant. As is known, nitrogen comprises nearly 80 percent of air and thus provides a large amount of nitrogen to the combustion reaction which may then react with oxygen to form $NO_x$.

It is known that combustion may be carried with reduced $NO_x$ generation by using technically pure oxygen or oxygen-enriched air as the oxidant as this reduces the amount of nitrogen provided to the combustion reaction on an equivalent oxygen basis. However, using such an oxidant in place of air in a combustion reaction has two disadvantages. One disadvantage is the significantly increased costs of such oxidants relative to air. A second disadvantage is that the high oxygen concentration of such oxidants causes the combustion reaction to run at a higher temperature than would be the case if air were the oxidant. The higher temperature kinetically favors the formation of $NO_x$ thus counteracting the tendency to produce less $NO_x$ because less nitrogen is present.

Accordingly, it is an object of this invention to provide an improved combustion method wherein $NO_x$ generation is reduced while overcoming the disadvantages of the known $NO_x$ reduction combustion methods set forth above.

SUMMARY OF THE INVENTION

The above and other objects which will become apparent to one skilled in the art upon a reading of this disclosure are attained by the present invention which is:

A method for carrying out combustion comprising:
(A) injecting fuel and first oxidant into a combustion chamber which contains furnace gases, and incompletely combusting the fuel with first oxidant within the combustion chamber in a flame stream to produce products of incomplete combustion;
(B) injecting into the combustion chamber a stream of second oxidant, having an oxygen concentration which exceeds that of the first oxidant, spaced from the flame stream and at a velocity of at least 200 feet per second;
(C) entraining furnace gases into the high velocity second oxidant to produce a diluted second oxidant stream;
(D) passing the diluted second oxidant stream into the flame stream such that the axis of the diluted second oxidant stream does not intersect the flame stream until the flame stream has passed through the combustion chamber a distance such that at least 90 percent of the oxygen in the first oxidant has reacted with fuel; and
(E) mixing the diluted second oxidant stream with the flame stream and combusting products of incomplete combustion with the diluted second oxidant.

DETAILED DESCRIPTION

The invention will be described in detail with reference to the drawings.

Figure 1:
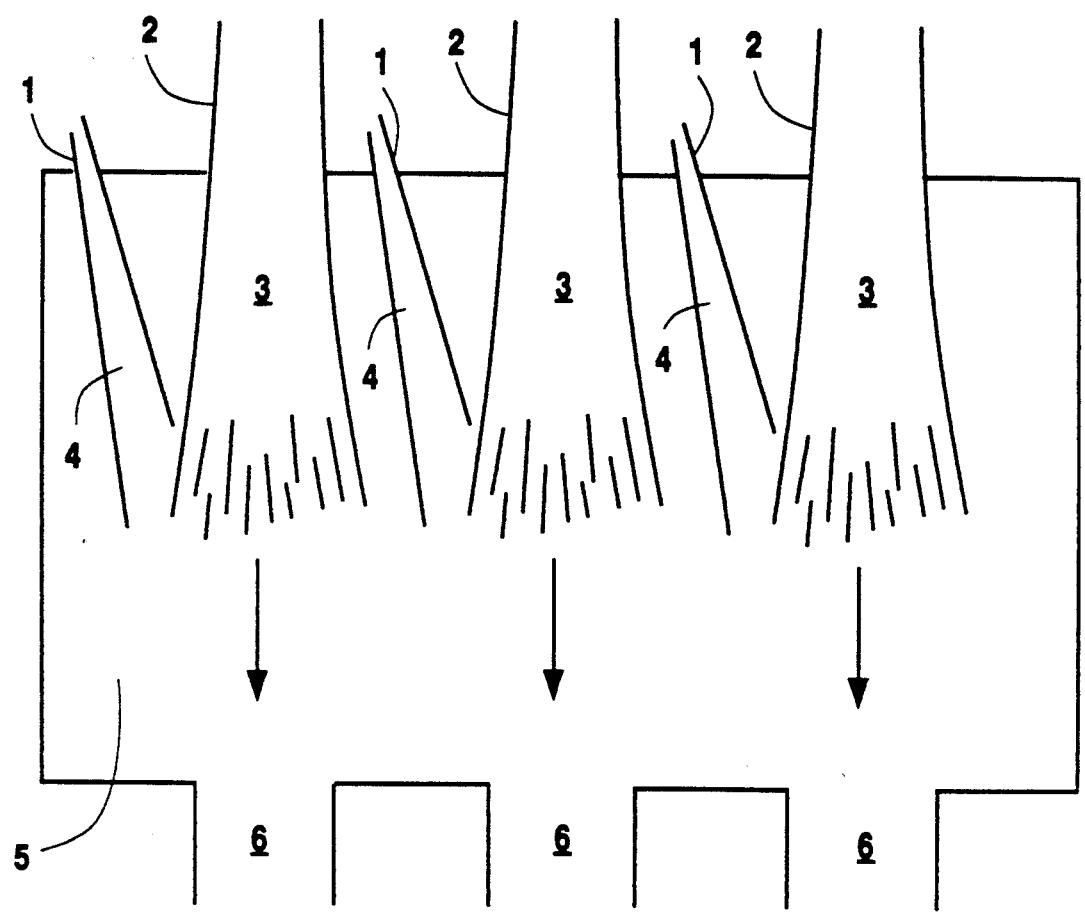
FIG. 1 is a simplified representation of one embodiment of the invention as it may be practiced in conjunction with a cross-fired furnace.

Referring now to FIG. 1 there is illustrated combustion chamber or zone 5 which in this embodiment is a cross-fired furnace such as might be employed for glassmelting. Combustion chamber 5 contains furnace gases which may include carbon dioxide, water vapor, nitrogen, oxygen, and trace amounts of gases such as carbon monoxide and hydrogen.

Fuel and first oxidant are injected into combustion chamber 5 such as through one or more burners 2. The fuel may be any fluid fuel such as methane, propane, natural gas or fuel oil. Preferably the first oxidant is air.

The fuel and first oxidant are injected into combustion chamber 5 is such a manner that they form a flame stream 3 wherein the fuel is incompletely combusted to produce products of incomplete combustion. Products of complete combustion may also be generated by the combustion of fuel with first oxidant. Preferably the fuel and first oxidant are injected into the combustion chamber in a substoichiometric or fuel-rich ratio in order to effect the requisite incomplete combustion. The products of incomplete combustion include incompletely oxidized species such as carbon monoxide and hydrogen as well as unburned fuel. As the combustion is carried out with the flame stream passing through the combustion chamber, the temperature within the flame stream rises, reaches a maximum, and begins to fall as the first oxidant proceeds toward total consumption.

There is also injected into combustion chamber 5 a stream of second oxidant such as through one or more lances 1. A lance is a device through which only one of oxidant and fuel may be injected into a combustion chamber whereas a burner is a device through which both fuel and oxidant may be injected into a combustion chamber. The second oxidant has an oxygen concentration which exceeds that of the first oxidant. Generally the second oxidant will have an oxygen concentration of at least 30 percent oxygen. Preferably the second oxidant will have an oxygen concentration of at least 90 percent and most preferably the second oxidant will be technically pure oxygen having an oxygen concentration of 99.5 percent or more.

The second oxidant is injected into the combustion chamber spaced from the flame stream and at a high velocity of at least 200 feet per second (fps). Preferably the injection velocity of the second oxidant is within the range of from 400 to 1000 fps.

The high velocity combined with the space between the second oxidant stream and the flame stream causes furnace gases from within the combustion zone to become entrained into the second oxidant stream thus producing a diluted and enlarged second oxidant stream designated by 4 in FIG. 1. Preferably, the second oxidant is injected into the combustion chamber at the same side or wall from which the fuel and first oxidant are injected into the combustion chamber so as to facilitate the requisite large entrainment of furnace gases into the second oxidant stream prior to the intersection with the flame stream.

The diluted second oxidant stream is passed into and combines with the flame stream at a point downstream of the point where the temperature within the flame stream has been reduced from its maximum by the radiation of heat from the flame stream. This will occur after the flame stream has traversed a distance through the combustion chamber such that at least 90 percent, and preferably at least 98 percent, of the oxygen in the first oxidant has reacted with fuel. Generally, this will occur when the flame stream has traversed at least half of the length of the combustion chamber, such length being measured in the axial direction of the flame stream. Accordingly, in the practice of this invention, the axis or centerline of the diluted second oxidant stream will generally intersect the flame stream at a point past the midpoint of the combustion chamber, although in some cases this intersection may occur after traversal of one third or one quarter of the length of the combustion chamber.

The enlarged high velocity diluted second oxidant stream has a high momentum owing to its high velocity and increased mass. Generally, the mass of the diluted second oxidant stream at the time of intersection will exceed that of the initially injected second oxidant stream by a factor of 10 or more. Upon the intersection of the diluted second oxidant stream with the flame stream, this high momentum causes the thorough mixing of diluted second oxidant with the products of incomplete combustion. The products of incomplete combustion then react with the diluted second oxidant in a combustion reaction to form products of complete combustion which may then become furnace gases. Gases are removed from the combustion zone through port or ports 6.

The invention is advantageous over other low $NO_x$ combustion processes because significantly less high oxygen concentration oxidant is employed, thus reducing the combustion costs. Generally, in the practice of this invention, about 80 percent or more of the total combustion is carried out with the lower oxygen concentration oxidant which is generally and preferably air.

Moreover, the invention also simultaneously solves the high temperature $NO_x$ generation problem along with the $NO_x$ from nitrogen concentration problem. Initially, the combustion in the flame stream with the first oxidant is incomplete. In this way, there is little oxygen available in the flame stream for reaction with nitrogen because the available oxygen is being reacted with the oxidizable species in the fuel. Thus, little $NO_x$ is formed in the flame stream despite the presence of a high nitrogen concentration from the use of the first oxidant such as air.

The entrainment of furnace gases into the second oxidant due to its high velocity and spaced relationship to the flame stream dilutes the initially high concentration of oxygen in the second oxidant so that by the time the second oxidant meets the flame stream at the defined downstream location, it no longer has such a high concentration of oxygen thus overcoming the aforedescribed kinetic $NO_x$ problem wherein high temperature caused by high oxygen concentration increases $NO_x$ generation. This advantage is further achieved due to the lowering of the temperature within the flame stream due to its defined long traversal of the combustion chamber prior to its intermixture and reaction with the second oxidant. The combustion with the second oxidant completes the combustion in the combustion chamber without bringing fuel into contact with high concentrations of oxygen as would be the case with conventional oxygen enrichment practices.

The result is that the fuel provided into the combustion zone is completely combusted thus efficiently releasing heat for use such as for melting glass, heating or melting of metals, or waste incineration. This is achieved without high costs because most of the combustion is achieved using first oxidant such as air. However, reduced $NO_x$ over conventional air combustion or oxygen enrichment combustion is achieved because of the initial incomplete combustion coupled with the subsequent downstream completion of the combustion with diluted second oxidant.

The following examples and comparative example serve to further illustrate the advantages attainable with the invention. They are not intended to be limiting.

Natural gas at a flowrate of 920 standard cubic feet per hour was injected with an oxidant having the composition of air into a test furnace. The air injection velocity was at 30 to 35 fps and at a flowrate of 95 percent of stoichiometric. Technically pure oxygen, sufficient to make up the oxygen shortfall, was injected into the test furnace in five separate tests at a distance of either 5.5 or 9.5 inches from the air injection port in a direction parallel to the air/fuel flow similar to that illustrated in FIG. 3. The oxygen velocities for each of five tests were within the range of from 579 to 1630 fps. The oxygen velocity and the injection point distance from the air/fuel flow enabled furnace gases to be entrained into the oxygen stream and the oxygen stream centerline to intersect the air/fuel flame stream after at least 90 percent of the oxygen in the air flow was combusted with the fuel flow. The $NO_x$ concentration in the exhaust from the furnace was measured for each of the five tests and found in each case to be within the range of from 139 to 152 parts per million (ppm).

For comparative purposes, another test was carried out with the same equipment and under similar conditions except that the air flow was not substoichiometric and no oxygen was injected. The $NO_x$ concentration in the furnace exhause was 310 ppm. In these examples and comparative example, the method of the invention enabled a $NO_x$ reduction of from 51 to 55 percent over that attainable with the conventional combustion system.

The invention enables one to carry out this very advantageous complete and efficient low $NO_x$ combustion in a single combustion chamber thus avoiding the significant complications invariably encountered with combustion processes which employ two or more combustion chambers or zones.

Figure 2:
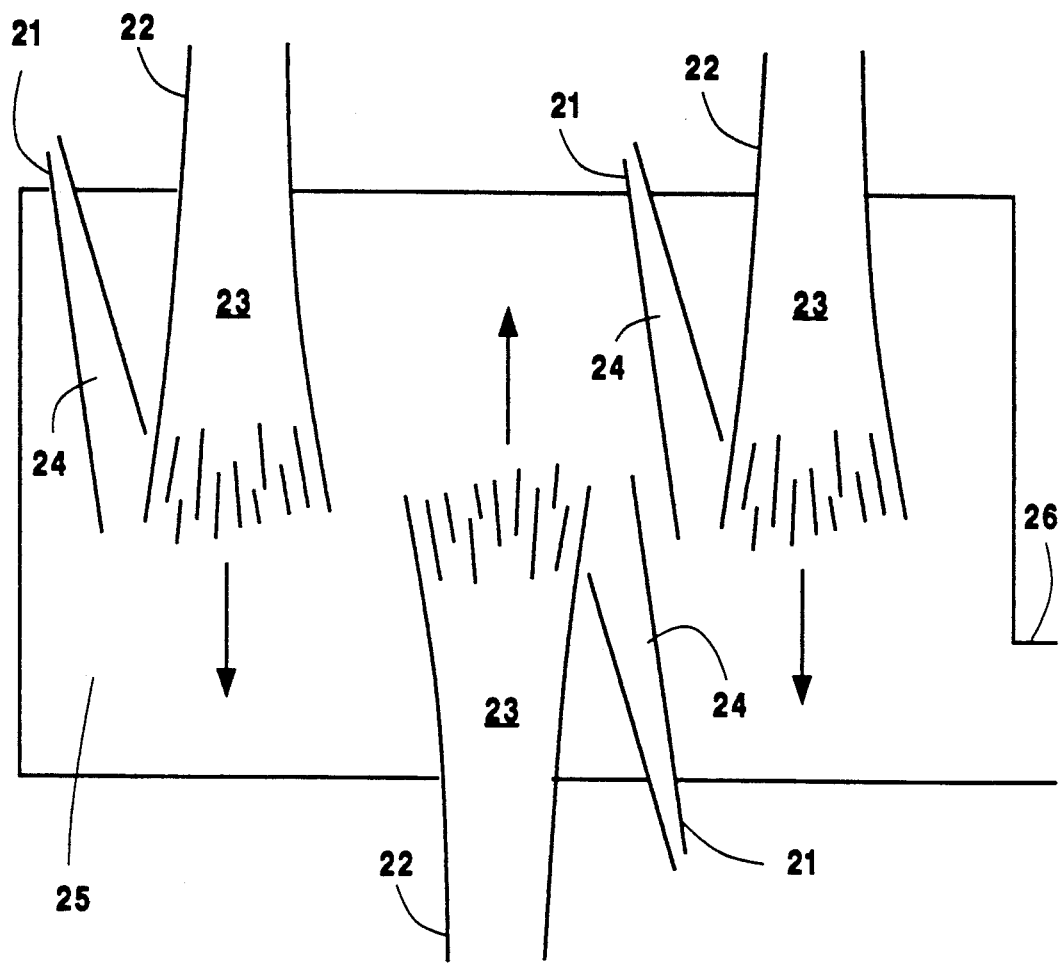
FIG. 2 is a simplified representation of another embodiment of the invention as it may be practiced in an opposed cross-fired furnace.
Figure 3:
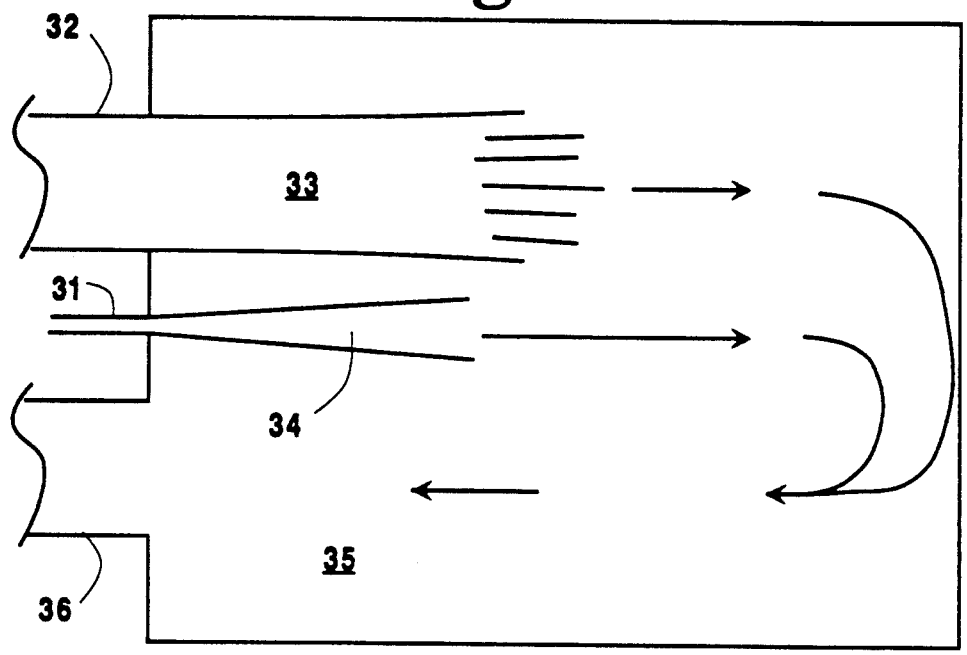
FIG. 3 is a simplified representation of one embodiment of the invention as it may be practiced in an end fired furnace.
Figure 4:
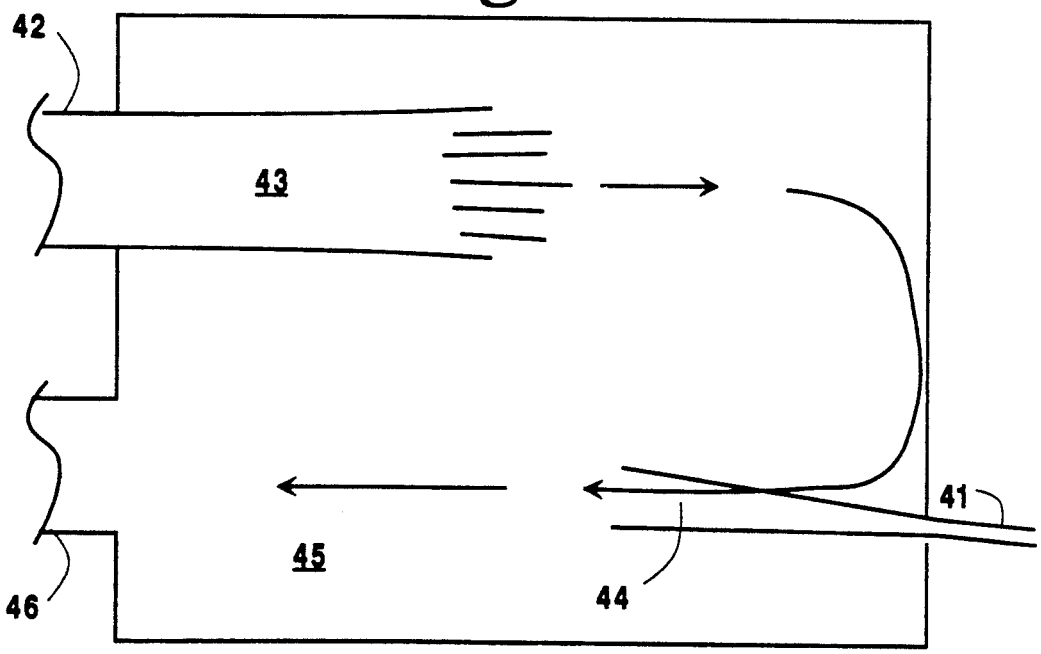
FIG. 4 is a simplified representation of another embodiment of the invention as it may be practiced in an end fired furnace.

FIGS. 2, 3, 4 illustrate other useful embodiments of the invention. The numerals in FIGS. 2, 3 and 4 correspond to those of FIG. 1 for the common elements plus 20, 30 and 40, respectively.

FIG. 2 illustrates a similar multi-burner combustion system as that illustrated in FIG. 1 except that one of the flame streams is directed in the opposite direction from that of the others and exit port 26 is in an endwall of the combustion chamber.

FIG. 3 illustrates an embodiment of the invention carried out firing lengthwise in a combustion chamber with the exit port 36 being at the injection end causing the flame stream to move in a turnaround or U shape.

FIG. 4 illustrates another lengthwise combustion embodiment wherein the second oxidant is injected into the combustion chamber from the opposite end to that from which the first oxidant is injected.

Although the invention has been described in detail with reference to certain embodiments, those skilled in the art will recognize that there are other embodiments of the invention within the spirit and the scope of the claims.

We claim:

1. A method for carrying out combustion comprising:
   (A) injecting fuel and first oxidant into a combustion chamber which contains furnace gases, and incompletely combusting the fuel with first oxidant within the combustion chamber in a flame stream to produce products of incomplete combustion;
   (B) injecting into the combustion chamber a stream of second oxidant, having an oxygen concentration which exceeds that of the first oxidant, spaced from the flame stream and at a velocity of at least 200 feet per second;
   (C) entraining furnace gases into the high velocity second oxidant to produce a diluted second oxidant stream;
   (D) passing the diluted second oxidant stream into the flame stream such that the axis of the diluted second oxidant stream does not intersect the flame stream until the flame stream has passed through the combustion chamber a distance such that at least 90 percent of the oxygen in the first oxidant has reacted with fuel; and
   (E) mixing the diluted second oxidant stream with the flame stream and combusting products of incomplete combustion with the diluted second oxidant.

2. The method of claim 1 wherein the first oxidant is air.

3. The method of claim 1 wherein the second oxidant has an oxygen concentration of at least 90 percent.

4. The method of claim 1 wherein the second oxidant is technically pure oxygen.

5. The method of claim 1 wherein the axis of the diluted second oxidant stream does not intersect the flame stream until the flame stream has passed the midpoint of the combustion chamber.

6. The method of claim 1 wherein the mass of the diluted second oxidant stream at the time of its intersection with the flame stream exceeds the mass of the second oxidant stream at the time of its injection into the combustion chamber by a factor of at least 10.

* * * * *